June 23, 1970 R. W. BENTLEY ET AL 3,517,273

REED RELAY ASSEMBLY WITH ALIGNMENT STRIPS

Filed Oct. 25, 1968

3 Sheets-Sheet 1

INVENTORS
ROBERT W. BENTLEY
ARTHUR B. CIESLAK
ADAM A. JORGENSEN

BY Hoffman Stone
ATTORNEY

June 23, 1970 R. W. BENTLEY ET AL 3,517,273

REED RELAY ASSEMBLY WITH ALIGNMENT STRIPS

Filed Oct. 25, 1968

3 Sheets-Sheet 2

INVENTORS
ROBERT W. BENTLEY
ARTHUR B. CIESLAK
ADAM A. JORGENSEN

BY Hofman Stone

ATTORNEY

June 23, 1970 R. W. BENTLEY ET AL 3,517,273

REED RELAY ASSEMBLY WITH ALIGNMENT STRIPS

Filed Oct. 25, 1968

3 Sheets-Sheet 3

INVENTORS
ROBERT W. BENTLEY
ARTHUR B. CIESLAK
ADAM A. JORGENSEN

BY [signature]

ATTORNEY

United States Patent Office 3,517,273
Patented June 23, 1970

3,517,273

REED RELAY ASSEMBLY WITH ALIGNMENT STRIPS

Robert W. Bentley, Penfield, Arthur B. Cieslak, Rochester, and Adam A. Jorgensen, Pittsford, N.Y., assignors to Stromberg-Carlson Corporation, Rochester, N.Y., a corporation of Delaware Filed Oct. 25, 1968; Ser. No. 770,732
Int. Cl. H02b *1/04;* H05k *7/02*
U.S. Cl. 317—101 4 Claims

ABSTRACT OF THE DISCLOSURE

A reed relay module including a box-like assembly of printed circiut cards mounting plural coil bobbin. Reed switches encapsulated in sealed glass tubes are mounted in the bobbins for actuation responsively to energization and deenergization of the coils. The assembly is specially adapted for automatic assembly by machinery at high speed and low cost. The bobbins are received on finger-like tabs, which extend edgewise from printed circuit cards, and are held in positive alignment by auxiliary guide strips. The guide strips include tabs projecting into the bobbins opposite from the tabs on the printed circuit cards, and also include tapered guide holes for aligning the tongues of the reed switches. A covering printed circuit card is mounted over the guide strips for selectively interconnecting the coils and the tongues of the reed switches.

BRIEF SUMMARY

This invention relates to a novel electromechanical switch assembly, and, more particularly, to a novel arrangement for mounting encapsulated reed switches on printed circuit cards, the arrangement being especially well suited for manufacture and assembly by highly automated mass production techniques and at relatively low cost.

Reed relays of the type with which the present invention is concerned are widely referred to as glass reed relays. A typical relay of this type includes a pair of electrical conductors made of magnetic material sealed within an elongated envelope of glass or other insulating material. Terminal portions of the conductors are sealed through the ends of the envelope and extend therefrom for connecting the conductors in an external circuit. The conductors are normally positioned slightly out of alignment with each other in the envelope, with their adjacent end portions overlapping and slightly spaced apart. When a magnetic field is applied, the adjacent end portions of the conductors are brought into contact with each other, thereby completing an electrical connection between the terminals.

For the purpose of operating the reeds, they may be mounted within an electrical coil generally parallel to the axis upon which the coil is wound. Typical arrangements of this type are shown in U.S. Pats Nos. 3,089,010 and 3,114,019, both issued to A. J. Koda.

Arrangements of this type are highly advantageous as compared especially with relays of the type heretofore widely used in telephone switching systems. They may be made very compact; their contacts are hermetically sealed and are not subject to contamination by dust, or to corrosion by the amibent atmosphere; they may be actuated by relatively small applied energies; and the glass reeds may be manufactured very inexpensively by highly automatic machinery.

One of the major problems with relays of this type, which has been the subject of a great deal of investigation heretofore, has been the problem of reducing the cost of assembling an array, or matrix of reed switches and their actuating coils, particularly toward the end of minimizing the amount of hand labor required.

Accordingly, one important object of the present invention is to provide a novel glass reed relay assembly which is particularly well adapted for highly automated production, and which requires very few or no hand operations in its manufacture.

Briefly, in accordance with the invention, the coil bobbins are mounted on finger-like tabs, which project edgewise from the printed circuit cards and are received in lateral, longitudinal grooves in the inner walls of the bobbins. Auxiliary guide strips are fitted across the ends of the bobbins opposite from the finger-like tabs, and include alignment tabs, which also project into the bobbins for fixing them accurately in predetermined alignment. The ends of the guide strips engage end portions of the printed circuit cards with a snap action latching arrangement. The guide strips are also apertured with tapered holes for receiving and accurately positioning the tongues of the glass reeds, and, if desired, terminal lugs carried by and projecting from the upper corners of the bobbins. An additional printed circuit card is placed across the assembly over the auxiliary guide strips for selectively interconnecting the tongues of the glass reeds and the terminal lugs projecting from the bobbins. The printed circuit cards are mechanically fitted together by a tab-in-slot arrangement, and electrical connections are effected through selected ones of the tabs by "plating through" holes in the tabs and then dip soldering, which fills the holes with solder to form bridge-like connections between conductors on opposite sides of the tabs.

DETAILED DESCRIPTION

This invention will now be described in greater detail in connection with the accompanying drawings, wherein.

Figure 1:
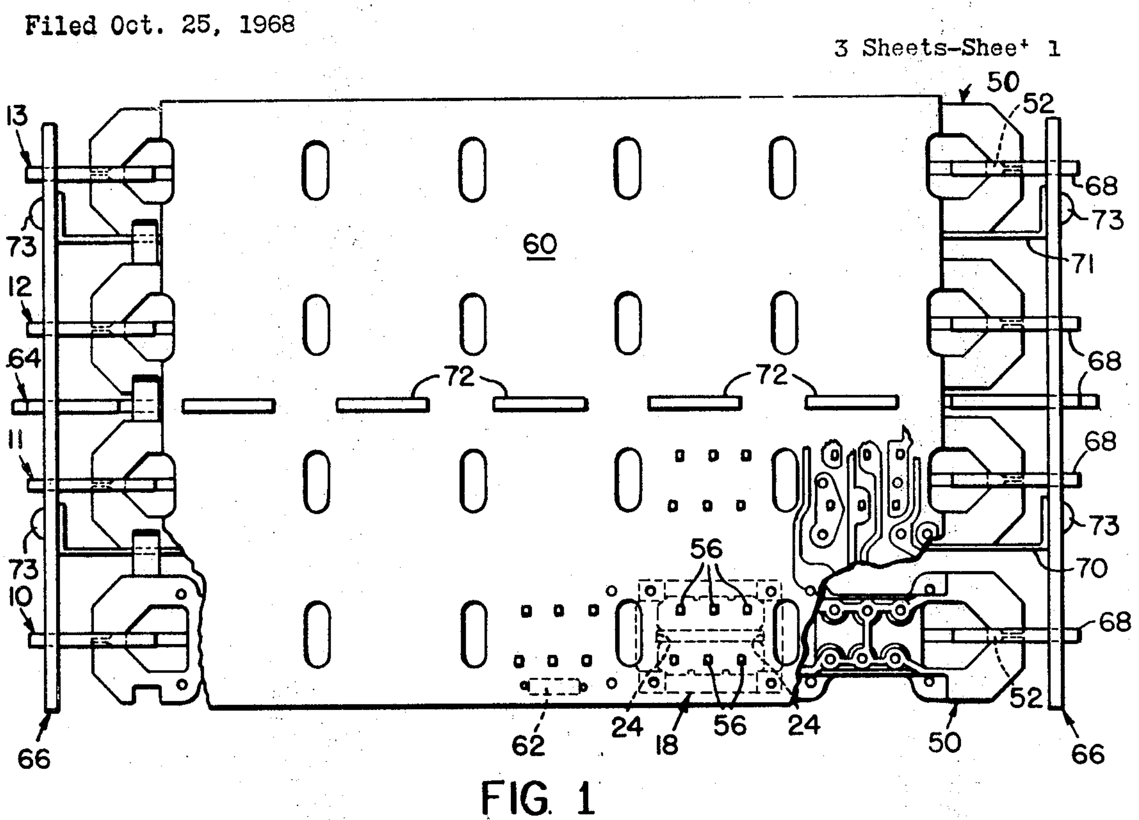
FIG. 1 is a plan view, with parts broken away, of a switch module in accordance with a presently preferred embodiment of the invention, showing actuating coils in a 5 x 4 array.

As shown in the drawings, the module of the invention includes four printed circuit cards 10, 11, 12, and 13 of substantially identical construction. Each of the cards 10–13 is in the form of a comb, and includes a base strip portion 14 and five alignment tabs 16 projecting from one edge of the base for aligning the coil bobbins 18. In addition, each of the cards 10–13 also includes a pair of finger-like extensions 20 at its opposite ends generally parallel to and longer than the tabs 16. Printed circuit conductors 22 formed by any desired process are adherently secured to the cards 10–13 in a pattern determined according to the functions to be performed by the module and the nature of the circuit to be used for controlling its operation. This is a matter that will vary in accordance with the designer's choice, and is not to be regarded as a limiting factor in the practice of the invention.

The bobbins 18, as shown, are of molded construction, and include inwardly facing, axially extending ribs, which define grooves 24 for receiving the tabs 16 of the printed circuit cards. A transversely slotted base portion 26 of each bobbin extends beyond the tabs 16 and over the base strip portion 14 of the printed circuit card. The base portion 26 of each bobbin is apertured to receive and retain terminal lugs 28 and 30. The lugs 28 and 30 include inwardly projecting contact finger portions 32 and 34, respectively, for slidably engaging selected conductive portions of the printed circuit on the cards 10–13 when the bobbins are placed in position upon the cards. The lugs 28 at the corners of the bobbins include outwardly projecting arms 36 to which the ends of the coil windings 38 are attached. The lugs 30 between the corner lugs 28 include laterally extending tabs 40 upon which the lower tongues 42 of the glass reeds rest. After initial assembly, the electrical connections are all firmly secured and stabilized by dip soldering.

Figure 2:
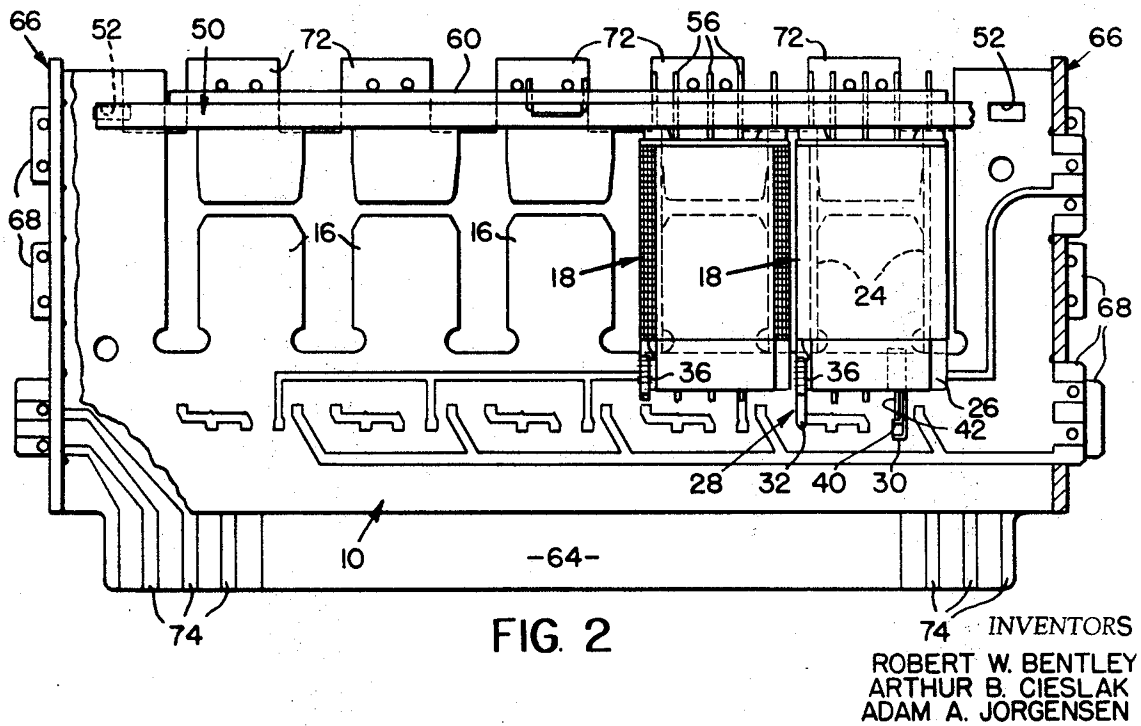
FIG. 2 is a side elevatioanl view, partly in section, and with parts broken away, of the module shown in FIG. 1.
Figure 3:
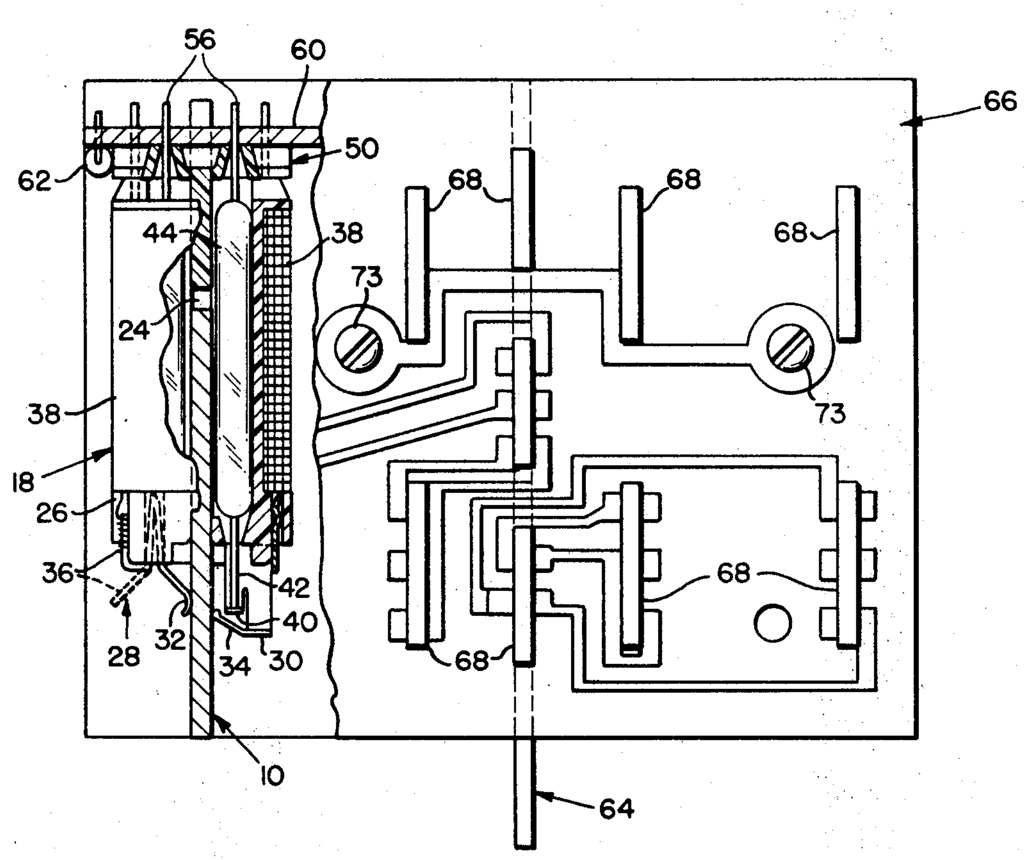
FIG. 3 is an end elevational view, partly in section, of the module shown in FIGS. 1 and 2.
Figure 4:
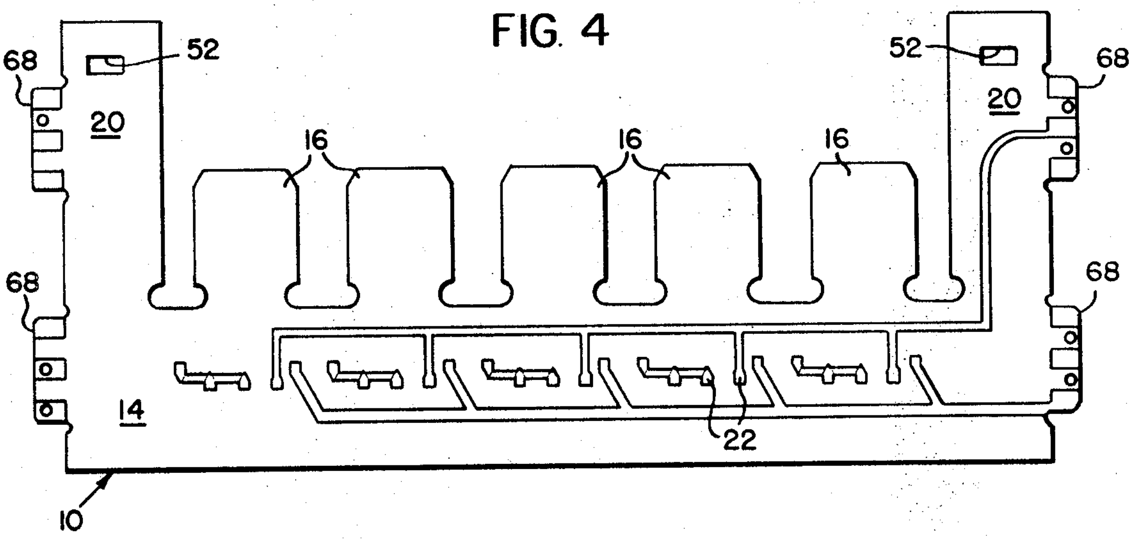
FIG. 4 is an elevational view of a printed circuit card that forms one member of the basic frame of the module shown in FGIS. 1–3, showing the card with the coils, glass reeds, and other circuit components removed, and including only a fragmentary showing of the printed circuit pattern.
Figure 5:
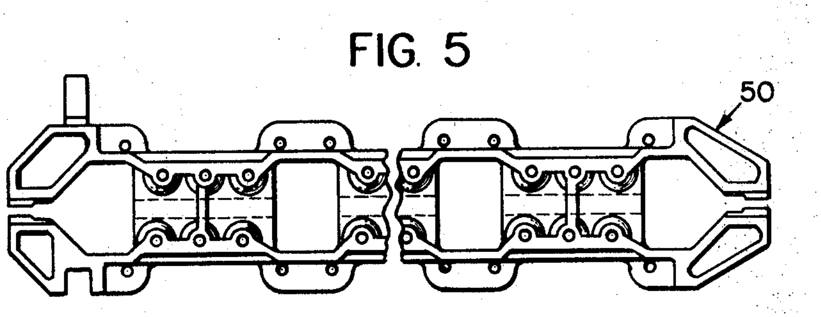
FIG. 5 is a plan view of one of the alignment strips which extend across the tops of the coils as viewed in FIGURE 2.
Figure 6:
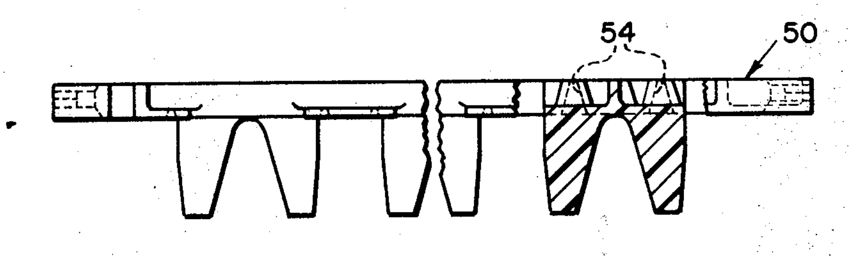
FIG. 6 is a longitudinal view, partly in section, of the strip shown in FIG. 5.

Auxiliary guide strips 50 extend across the tops of the bobbins as viewed in FIG. 2 for holding them and the glass reeds 44 in precise alignment. The ends of the strips 50 are notched in re-entrant fashion to provide opposed tab portions (not separately designated) which latch with a snap spring action into slots 52 in the end portions 20 of the printed circuit cards. In addition, the strips 50 include tapered apertures 54 for receiving and aligning the upper tongues 56 of the glass reeds. During assembly, the glass reeds 44 are simply dropped into the bobbins 18. Their lower tongues 42 fit loosely through axial apertures (not separately designated) in the base portions 26 of the bobbins. Their upper tongues 56 are not precisely positioned until after the alignment strips 50 are put in place. The space within the bobbins is sufficiently limited so that the glass reeds are caged in the assembly and held in alignment within the tolerance necessary to have them enter the tapered holes 54 when the strips are applied. The strips 50 then hold the upper tongues 56 in precise alignment to allow assembly of the covering printed circuit card 60. If desired, additional circuit components such as the diode 62 shown (FIG. 3) may be mounted on the covering card 60, preferably on the under side, with their terminals projecting upwardly through the card 60 for connection to conductors on its upper surface.

The printed circuit cards 10–13 are mounted in common with a central connector card 64 between transversely extending end printed circuit cards 66. The cards 10–13 and 64 include longitudinally projecting tabs 68, which extend through slots (not separately designated) in the end cards 66 for retaining the cards 10–13 and 64 in parallel spaced alignment. In addition, the assembly is retained by magnetic shields 70 and 71, which are fitted, respectively, between the two cards 10 and 11 on one side of the connector card 64, and between the other two cards 12 and 13. The magnetic shields 70 and 71 are rigidly secured as by the screws 73 shown in FIG. 1, or other tension fastening devices to the end cards 66.

Once all the lower components are assembled, including the magnetic shields 70 and 71 and the guide strips 50, the cover card 60 is simply dropped over the assembly and guided into position by upwardly projecting tabs 72 on the connector card 64, which extend through guide slots (not separately designated) in the cover card 60. The upper tongues 54 of the glass reeds, the upwardly projecting terminal lugs on the bobbins, and the terminals of the diodes 62 all project through the cover card 60 for connection by dip soldering to circuit portions on the cover card immediately adjacent to the holes through which the various tongues and terminals project. The cover card 60 is held in position by any desired jig or retaining arrangement while the assembly is inverted for dip soldering.

The tabs 72 on the connector card, and the end tabs 68 on the connector card and on the other printed circuit cards are apertured to provide electrical connections through them. The holes (not separately designated) in the tabs are lined with conductive material by, for example, electroplating techniques so that when the module is dip soldered, the holes are filled with solder to form conductive bridges through the tabs.

All of the external circuit connections to the module are made through conductive pad terminals 74 on the connector card 64, which are aligned on the lower portion of the connector card below the bottom edges of the cards 10–13 that mount the bobbins 18. This portion of the connector card is arranged to fit into a conventional multi-terminal plug receptacle.

What is claimed is:

1. An electromechanical switch module comprising plural printed circuit cards, plural coil bobbins, said cards including finger portions projecting edgewise from said cards into said bobbins for holding said bobbins in spaced alignment along said cards, terminal lugs fixed to said bobbins and extending into abutting engagement with said cards adjacent to the roots of said finger portions, selected ones of said terminal lugs including integral tabs extending inwardly partly across said bobbins, plural glass reed switches mounted within said bobbins, one tongue of each of said glass reed switches resting in abutting engagement upon one of said integral tabs, guide strips extending along the ends of said bobbins opposite from the roots of said finger portions, said guide strips being approximately coextensive with said cards and including tab portions extending into said bobbins for aligning and positioning them, said guide strips also engaging end portions of said cards respectively, and other printed circuit cards extending traversely across the ends of said cards with said finger portions for holding them in spaced parallel array and for electrically interconnecting them, said cards with said finger portions including integral endwise projecting tabs fitted into slots in said other cards.

2. A switch module according to claim 1 including a printed circuit card superimposed on said guide strips and extending over all of said guide strips, said guide strips and said superimposed card being apertured, tongues of said reed switches extending through said guide strips and said superimposed card, and printed circuit conductors on said superimposed card for selectively making electrical connections to said tongues extending through it.

3. A switch module according to claim 2 in which all electrical connections among its elements are made without mechanical fastening devices.

4. An electromechanical switch module comprising plural printed circuit cards, plural coil bobbins, said cards including finger portions projecting edgewise from said cards into said bobbins for holding said bobbins in spaced alignment along said cards, terminal lugs fixed to said bobbins and extending into abutting engagement with said cards adjacent to the roots of said finger portions, selected ones of said terminal lugs including integral tabs extending inwardly partly across said bobbins, plural glass reed switches mounted within said bobbins, one tongue of each of said glass reed switches resting in abutting engagement upon one of said integral tabs, guide strips extending along the ends of said bobbins opposite from the roots of said finger portions, said guide strips being approximately coextensive with said cards and including tab portions extending into said bobbins for aligning and positioning them, said guide strips also engaging end portions of said cards respectively, and other printed circuit cards extending traversely across the ends of said cards with said finger portions for holding them in spaced parallel array and for electrically interconnecting them, said cards with said finger portions including integral endwise projecting tabs fitted into slots in said other cards, all electrical connections between the various elements of the module being made without mechanical fastening devices.

References Cited

UNITED STATES PATENTS

| | | | |
|---|---|---|---|
| 3,031,550 | 4/1962 | Morrison. | |
| 3,038,976 | 6/1962 | Koda. | |
| 3,089,010 | 5/1963 | Koda | 335—152 |
| 3,114,080 | 12/1963 | Koda et al. | |
| 3,114,807 | 12/1963 | Koda. | |

| | | | |
|---|---|---|---|
| 3,170,089 | 2/1965 | Zielinski | 317—101 |
| 3,177,315 | 4/1965 | Clare. | |
| 3,215,794 | 11/1965 | Zielinski. | |
| 3,386,056 | 5/1968 | Frydman | 317—101 XR |

ROBERT K. SCHAEFER, Primary Examiner

J. R. SCOTT, Assistant Examiner

U.S. Cl. X.R.

335—152